United States Patent Office 2,872,493
Patented Feb. 3, 1959

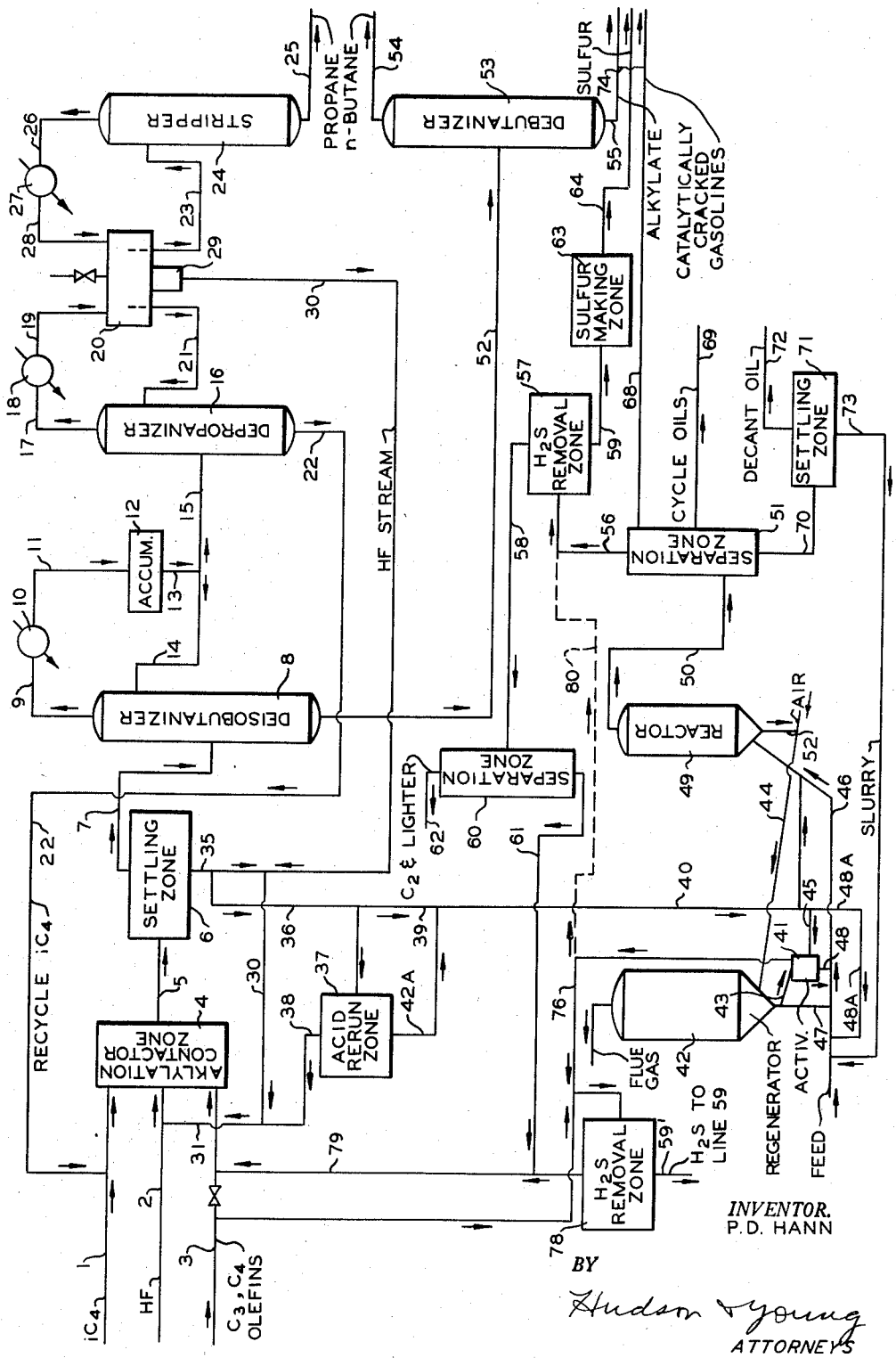

2,872,493
UTILIZATION OF ALKYLATION BY-PRODUCTS
Paul D. Hann, Bartlesville, Okla., assignor to Phillips Petroleum Company, a corporation of Delaware
Application March 6, 1956, Serial No. 569,881
3 Claims. (Cl. 260—677)

This invention relates to the utilization of alkylation by-product. In one of its aspects, the invention is concerned with the activation of a catalyst, suitable for cracking of hydrocarbons, by contacting said catalyst with an acid soluble oil obtained from an HF alkylation of hydrocarbons. In another of its aspects, the invention relates to the production and recovery of substantially paraffin-free olefin, for example ethane-free olefin, by contacting a regenerated silica-alumina type cracking catalyst with a catalyst soluble oil obtained as described herein. A further aspect of the invention is concerned with the recovery of sulfur from a catalyst soluble oil obtained as described herein by contacting said oil with a silica-alumina type cracking catalyst thus forming hydrogen sulfide from which sulfur can be obtained by known methods. Another aspect of the invention is the provision of a combination operation in which a catalyst soluble oil obtained as herein set forth is used to activate a catalyst of the silica-alumina type for an ensuing cracking of a hydrocarbon, ethane-free olefin which is utilized in the catalytic alkylation step in which the catalyst soluble oil is obtained, and hydrogen sulfide is recovered as a useful product.

The catalytic alkylation of hydrocarbons employing hydrofluoric acid or hydrogen fluoride as a catalyst is well known. In one such operation, an isoparaffin, for example isobutane and an olefin, for example butylene, are contacted in an isoparaffin olefin mol ratio of approximately 6:1 in a reactor in the presence of hydrofluoric acid catalyst at a temperature of approximately 90° F. and at a pressure sufficient to maintain liquid phase. The hydrofluoric acid catalyst is employed in a mol ratio of catalyst to oil of approximately 1:1. Effluent from the contactor is charged to a settler in which is formed an upper hydrocarbon layer which is removed and further processed and a lower acid layer which is recycled to the vessel in which the contacting is effected. However, it is customary to take a slip stream of used acid and to recover the same in a so-called rerun unit. The conventional acid rerun unit is known to those skilled in the art and comprises a series of fractionation steps to separate acid soluble oils from the hydrofluoric acid phase. It is this oil to which my process is directed. For further details of a process in which alkylation of hydrocarbons is conducted, the reader is referred to "Hydrofluoric Acid Alkylation," published by the Phillips Petroleum Company, Bartlesville, Oklahoma (1946).

It is also known that a silica-alumina cracking catalyst can have its activity increased by treatment with an organic fluoride-containing oil at conversion conditions. Thus, it is known that the HF produced from the organic fluoride breakup forms catalytically active compounds with silica-alumina catalyst. That is, the alumina forms non-volatile compounds with the HF, and the silica forms silicon tetrafluoride which is volatile and which reacts with other alumina to form a non-volatile complex.

An object of this invention is to provide a combination operation for the beneficiation of an alkylation by-product. Another object of this invention is to provide a combination operation in which a catalyst soluble oil resulting from an HF alkylation of hydrocarbons is beneficiated. Another object of this invention is the obtaining of an ethane or paraffin-free olefin. A further object of this invention is the recovery of hydrogen sulfide from a catalyst soluble oil obtained as herein defined.

Other aspects, objects and several advantages of the invention are apparent from a study of this disclosure, the drawing and the appended claims.

According to this invention, a catalyst soluble oil, obtained from a catalyst phase of an HF alkylation of hydrocarbons, for example an isoparaffin with an olefin or an aromatic with an olefin or an aromatic with an isoparaffin, etc., is contacted under mild conditions with a portion of a silica-alumina type catalyst which has been regenerated to improve its activity for catalytic cracking of hydrocarbons and concomitantly to produce substantially ethane-free olefin and hydrogen sulfide, the hydrogen sulfide is removed, the olefin is returned to the alkylation step, and the catalyst is employed in the said cracking step. Thus, there is provided a unitary operation based upon the specific concept of combining the alkylation and cracking operations by way of the use of a catalyst soluble oil formed in the one to increase the activity of the catalyst for use in the other, obtaining as a by-product of the catalyst treatment, olefins which can be used in the alkylation and whatever sulfur compounds are recovered in the sulfur removal step. The invention is not limited to the use of the recovered olefin in the alkylation step. Thus, the olefin can be used directly for chemical operations in which an olefin is converted by way of polymerization or other treatment. Also, it is clear that the sulfur compounds, principally hydrogen sulfide, can be further treated to recover sulfur therefrom.

It is within the scope of the invention as described herein to contact the acid soluble oil with either the used or regenerated cracking catalyst or both although presently the contact with the regenerated catalyst is preferred. Further, it is within the scope of the invention to contact an unusued catalyst with the catalyst soluble oil to activate or otherwise modify the same.

Ordinarily, the acid soluble oil is contacted with the cracking catalyst in a small slip stream, preferably employing a separate contactor or reactor although it is possible to effectuate the contact treatment in a catalyst downleg of the reactor and/or regenerator of the conventional cracking operation in which a fluidized catalytic contacting is being effectuated. Furthermore, the treatment can also be effected in the conventional cooler recycle of regenerated catalyst. Still further, it is within the scope of the present invention to otherwise effectuate the contacting, for example the acid soluble oil can be added to the oil feed charge to the cracking reactor. In this manner, a uniformly distributed predetermined proportion of acid soluble oil is deposited upon the catalyst for the treatment of the same uniformly throughout its mass.

The hydrogen sulfide or other sulfur compounds which are obtained upon the contacting of the catalyst soluble oil with the silica-alumina cracking type catalyst is recovered from the catalytic contacting zone separately if a separate zone is employed or it can be recovered with the hydrocarbons from the cracking zone or by way of said zone and then removed from said hydrocarbons by conventional means, for example by treating with a caustic. However, if the sulfur in the hydrogen sulfide is desired to be beneficiated, it is within the scope of the invention to employ a sulfur recovery unit comprising, in combination, a hydrogen sulfide recovery unit and a sulfur from hydrogen sulfide recovery unit.

The drawing shows, in schematic arrangement, a combination according to the present invention.

Referring now to the drawing, through lines 1, 2, and 3, respectively, there are introduced into an alkylation contactor zone 4 isobutane, hydrofluoric acid catalyst and $C_3$, $C_4$ olefins in proportions known in the art and as described herein. After a residence time of from about 5 to 15 minutes, or longer if desired, the mixture from the contactor zone, which is now in the form of an "emulsion," is passed by way of line 5 to settling zone 6, wherein a hydrocarbon phase and an acid phase are formed. The hydrocarbon phase is taken from settling zone by way of line 7 and deisobutanized in deisobutanizer 8. Isobutane containing propane is taken overhead from tower 8 by way of line 9, cooler 10, and line 11 into accumulator 12, from which it is passed by way of lines 13 and 14 into the deisobutanizer as reflux. Production quantities of isobutane and propane are passed by way of line 15 to depropanizer 16. Propane is removed overhead by way of line 17, cooler 18 and line 19 into accumulator 20. From accumulator 20, liquid accumulating therein is returned by way of line 21, into tower 16 as reflux therefor. Bottoms from the depropanizer are substantially isobutane and are returned by way of line 22 to line 1 and thence to contactor 4. Returning to accumulator 20, production quantities of propane are passed by way of pipe 23 to stripper 24, bottoms from which constitute propane which is removed to storage or for use as desired by way of line 25. Overhead from stripper 24 is passed by way of line 26, cooler 27 and line 28 to the accumulator 20. From accumulator 20, specifically from well 29, it is removed by way of line 30. A hydrofluoric acid stream is passed by way of line 30 back to line 31, then to line 2, and by line 2 to contactor 4 for reuse. Returning to settling zone 6, the acid phase is withdrawn by way of line 35 and passed by way of lines 30 and 31 for reuse. A slip stream of this acid phase is passed by way of line 36 into acid rerun unit 37 wherein catalyst soluble oil is separated from the rerun acid and recovered hydrofluoric acid catalyst is returned to the system for reuse by lines 38, 31 and 2. As a feature of this invention, at least a portion of the used acid can be passed by way of line 39 and line 40 directly to catalyst activator unit 41. This used acid will contain catalyst soluble oil and acid as will be understood by those skilled in the art in possession of this disclosure. Catalyst soluble oil is removed from acid rerun unit 37 by way of line 42A and passed by way of line 40 to activator unit 41. Thus, it is possible according to the invention to use either the catalyst soluble oil as it is contained in the used acid and/or after the acid has been rerun and the catalyst soluble oil separated therefrom. In any event, in activator 41, the catalyst soluble oil is contacted with regenerated catalyst, passed to activator 41 from regenerator 42 by way of line 43 for reactivation. The reactivated regenerated catalyst passed from activator 41 is passed to line 46 by way of line 48. In the event that that modification of the invention is employed in which at least a portion of the catalyst soluble oil is contacted with the catalyst by admixing the same with the feed, there is provided line 45 to split the catalyst soluble oil from line 40 to feed line 46 in which feed introduced to the system is mixed in line 46 with regenerated catalyst from regenerator 42, passed by way of line 47 to line 46. In lieu of line 45, it is a feature of this invention that the catalyst soluble oil is admixed with the feed before it contacts the catalyst in order to secure thorough and uniform dissemination of the catalyst soluble oil upon the catalyst particles to be treated. It will be noted that in such event the catalyst soluble oil, which can be supplied to line 46 by way of line 48A would be mixed with the feed before it contacts the catalyst and would contact all of the catalyst which is contacted by the feed. This is different from the contacting of a slip stream of catalyst in activator 41. When the catalyst soluble oil or acid containing the same crosses by way of line 45, it contacts all of the catalyst which is contacted by the oil. It is presently preferred in this last-mentioned modification to admix the catalyst soluble oil by way of line 48A in view of the better distribution which is obtained as described.

According to the invention, the catalyst is activated by reaction of the catalyst soluble oil therewith forming olefin without forming paraffin. Of course, as shown in the drawing, where a feed is employed, such as gas oil or reduced crude, cracking will take place in reactor 49 from which product will be removed overhead by line 50 into fractionation zone 51. Used catalyst is removed by way of line 52 and passed by way of line 44, admixed with air and returned to the regenerator. As shown in the drawing, fractionation zone 51 is a zone separate and apart from fractionator or deisobutanizer 8. It is within the scope of the invention to fractionate the bottoms of deisobutanizer 8 in fractionation zone 51. However, for the sake of simplicity, the bottoms from deisobutanizer 8 are passed by way of line 52 to deisobutanizer 53, from which normal butane is removed overhead by way of line 54 for storage and alkylate is removed for further conventional processing or splitting, if desired, by way of line 55. In fractionation zone 51, the charge stream 50 from reactor 49 is fractionated according to known manner to provide by way of overhead line 56 a normal butane and lighter fraction including gaseous decomposition products resulting from any catalyst reactivation conducted in pipe 46 and/or in reactor 49. This stream 56 can be treated in hydrogen sulfide removal zone 57 to obtain hydrocarbon product by way of line 58 and hydrogen sulfide containing gases by way of line 59. Hydrogen sulfide 59 is passed to zone 63 wherein the hydrogen sulfide is converted to sulfur which is obtained by way of a discharge line 64. The recovery of hydrogen sulfide can be practiced employing such as an ethanolamine or diethanolamine scrubber. The sulfur can be recovered from the hydrogen sulfide by catalytic reactions known in the art for the recovery of sulfur from sour gases or hydrogen sulfide gases. Hydrogen sulfide-free product is passed by way of line 58 to separating zone 60 wherefrom by way of line 62 an effluent of ethane and lighter is recovered as fuel gas. The bottoms from zone 60, comprised of olefins, isobutane, and normal butane, are passed via lines 61 and 79 to the alkylation zone 4. Returning to fractionation zone 51, a gasoline containing stream is obtained by way of line 68 and cycle oils by way of line 69. Some catalyst and oil in the form of a slurry is removed from zone 51 by way of line 70 to settler 71. Oil decanted from the slurry is recovered by way of line 72 and the slurry recycled by way of line 73. As a feature of the invention, the alkylate here or before it has been split, as known in the art, is at least in part blended with the gasolines and this is schematically shown by way of the provided cross-over line 74.

The catalyst soluble oil which constitutes about 10 percent weight of the acid recovered from settling zone 6 by way of line 35 is of the following character (which oil is the oil used in the example set out in this specification):

| | |
|---|---|
| Gravity, API, 60°/60° F | 16.4 |
| Flash point, ° F | 230+ |
| Pour point, ° F | 80 |
| Viscosity at 210° F., SUS | 292 |
| Fluorine, wt. percent | 2.3 |
| ASTM Distillation, ° F., vol. percent distilled | 1.2 |
| Sulfur, weight percent: | |
| First drop | 220 |
| 5 | 480 |
| 10 | 546 |
| 20 | 584 |
| 30 | 604 |
| 40 | 618 |
| 50 | 627 |
| 60 | 635 |
| 70 (cracking begins) | 640 |

The catalyst which is treated with the catalyst soluble oil is ordinarily a silica-alumina type cracking catalyst;

it can be an acid treated clay such as montmorillonite, etc. In the cracking operation in reactor 49, there is conducted a conventional cracking of virgin gas oil charge having a 450° to 950° F. boiling range and the contacting is in a ratio of 6 of catalyst to 1 of oil. In reactor 49, there is maintained a pressure of approximately 15 pounds per square inch gauge and a temperature of 900° F. with a contact time of 10 seconds. Upon regeneration of this catalyst in regenerator 42, there is obtained the catalyst which is contacted with the catalyst soluble oil, above described, resulting in product and in operation as has been described. When the catalyst is activated in zone 41, which is now my preferred embodiment, the products which are obtained from zone 41 by line 76 can be caustic treated or otherwise depleted of hydrogen sulfide in 78 and passed by way of line 79 to line 3 constituting a paraffin-free olefin source for alkylation contactor zone 4. In lieu of the caustic treating zone or ethanolamine or diethanolamine treating zone 78 according to the invention, the gaseous stream can be conducted by way of line 80 to the hydrogen sulfide recovery zone 57 or to a zone similar thereto from which an olefin can be recovered by known means. It will be noted that the return of paraffin-free olefin in line 76, by way of zone 78 and line 79, according to the invention, provides an advantage in that there is recovered olefin charge to alkylation zone 4 which does not contain paraffin required to be fractionated out downstream of the alkylation section of the drawing.

The catalyst which is removed from reactor 49, termed "spent catalyst" or carbon containing catalyst, usually contains about 1.5 weight percent coke and is regenerated in regenerator 42 at a temperature of approximately 1050° F., 15 per square inch gauge and during a contact time of about 10 minutes. This catalyst when regenerated is passed by way of line 43 to activator 41 and therein treated with the fluorine containing acid soluble oil at a temperature in the approximate range of 700° to 850° F., preferably about 770° to 800° F., still more preferably at about 780° F. About 0.4 weight percent of the catalyst treated of catalyst soluble oil (measured as fluoride) is employed when contacting the regenerated catalyst in activator 41. Somewhat more than this amount can be employed when the catalyst soluble oil is mixed directly with the feed especially before the feed is mixed with the catalyst. However, one skilled in the art in possession of this description will be able to obtain the optimum ratio of catalyst soluble oil to catalyst for the modus operandi and ensuing cracking operation desired to be effected.

In the following tabulation are set forth the general conditions of operation applicable to the various steps of the present invention.

I. *Alkylation:*
    Charge: Isoparaffin (isobutane, isopentane) and olefin (propylene, various butylenes and amylenes). Catalyst; hydrofluoric acid—
        Acid to feed mol ratio_____ 0.25:1.0 to 2.0:1.0.
        Contact time, minutes_____ 1 to 30.
        Isoparaffin to olefin mol ratio_____ 3:1.0 to 20:1.0.
        Contactor temperature, °F_____ 50 to 150.
        Pressure_____ to maintain liquid.

II. *Catalytic cracking:*
    Reactor: Catalyst; acid treated clay (montmorillonite, synthetic silica-alumina, etc.). Oil charge; gas oil, reduced crude, etc.—
        Catalyst to Oil weight ratio_____ 5:1 to 20:1.
        Contact time, seconds_____ 1 to 20.
        Temperature, °F_____ 890 to 930.
        Pressure, p. s. i. g_____ 0 to 25.
    Regenerator—
        Temperature, °F_____ 1020 to 1100.
        Pressure, p. s. i. g_____ 0 to 25.
        Contact time, minutes_____ 5 to 20.
        Regeneration gas (air) sufficient to reduce carbon on catalyst from about 1.5 to 0.3 weight percent carbon.

III. *Activation step:*
    Catalyst/Acid Soluble Oil Wt. Ratio___ 2.5:1 to 12:1.
    Temperature, °F_____ (550 to 850) 400 to 850.
    Contact time, minutes_____ 0.1 to 5.0
    Pressure, p. s. i. g_____ 0 to 25.
    Weight percent of HF acid soluble oil_ 0.2 to 1.0.
    (as fluorine) to catalyst.

It should be noted that hydrogen fluoride can be released from the catalyst soluble oil at temperatures as low as 400° F. and that hydrogen sulfide will be generated during such contact at a temperature even as low as 550° F. When operating at the lower catalyst to acid soluble oil ratio in a lower temperature operation, the heavier ends of the oil will, of course, not be cracked entirely and these materials from which the HF has been released to activate the catalyst will undergo cracking with the treated catalyst stream in line 46 and reactor 49.

At the high catalyst to acid soluble oil ratio and at the higher temperatures substantially all of the catalyst soluble oil is decomposed to form HF, $H_2S$ and olefin materials. The olefin materials upon recovery thereof, as described herein, can be charged to the alkylation, as described, and can be fractionated or only a portion thereof can be charged to alkylation.

According to this invention, it is deemed advisable that hydrogen fluoride which is released during regeneration of the used catalyst be recovered and returned to the alkylation process.

*Example*

A slip stream of regenerated silica-alumina catalyst at 1050° F. is reacted with acid soluble oil at 300° F. in a catalyst to oil ratio of 8 to 1 producing a reaction temperature of 780° F. The organic fluorides in the acid soluble oil are broken down into olefin and HF, which HF reacts with the catalyst to activate same. The organo-sulfur compounds break down to olefin and $H_2S$. The remaining portion of the oil is cracked to an olefinic material. The $H_2S$-olefin stream is caustic treated (conventional caustic washing process) to yield a substantially ethane-free olefine charge for the alkylation step.

The process has, therefore, reacted one stream from the alkylation process with the catalyst in the cracking operation to produce an improved cracking catalyst plus additional olefinic material which is returned to the alkylation step to produce additional alkylate, as described.

The isoparaffins I use include the 2-methyl alkanes such as isobutane, isopentane, isohexane, etc.; the olefins I use include aliphatic olefins such as ethylene, propylene, butylene, amylene, etc.; the aromatics I use include monocyclic aromatics such as benzene, toluene, xylene, ethylbenzene, isopropylbenzene, etc.; however, I may use polycyclic aromatics such as naphthalene.

Reasonable variation and modification are possible within the scope of the foregoing disclosure, the drawing, and the appended claims to the invention, the essence of which is (a) that a hydrofluoric acid catalyst soluble oil is used to reactivate an originally used or regenerated spent hydrocarbon cracking catalyst of the silica-alumina type, (b) that a unitary or combination operation has been provided wherein an additional source of paraffin-free olefin is obtained in situ for an alkllation and use is made of the acid soluble oil of said alkylation to provide said olefin source and (c) that sulfur compounds from said acid soluble oil are recovered, usefully, all as herein set forth and described with additional advantages that are apparent from a study of this disclosure, the drawing, and the appended claims.

I claim:

1. A method of activating silica-alumina type hydrocarbon cracking catalyst which comprises contacting the same under catalyst activating conditions with an HF alkylation catalyst acid soluble oil, said conditions including an elevated temperature sufficient to produce paraffin-free olefin and hydrogen sulfide from said soluble oil.

2. A method according to claim 1 wherein the olefin is recovered and used in an alkylation operation.

3. A method according to claim 2 wherein the olefin which is recovered is treated with a sulfur compound removal agent.

References Cited in the file of this patent

UNITED STATES PATENTS

| | | |
|---|---|---|
| 2,456,435 | Matuszak | Dec. 14, 1948 |
| 2,507,764 | Carnell | May 16, 1950 |
| 2,525,812 | Lien et al. | Oct. 17, 1950 |
| 2,558,375 | Olson | June 26, 1951 |

OTHER REFERENCES

Hoog et al., Oil and Gas Journal, vol. 52, No. 5, June 8, 1953, pages 92–96 (pages 92 and 93 only relied on).